(12) United States Patent
Kajiya et al.

(10) Patent No.: US 8,114,309 B2
(45) Date of Patent: Feb. 14, 2012

(54) LITHIUM-MANGANESE COMPOSITE OXIDES FOR LITHIUM ION BATTERY AND PROCESS FOR PREPARING SAME

(75) Inventors: Yoshio Kajiya, Kitaibaraki (JP); Hirohito Sato, Kitaibaraki (JP); Ryuichi Nagase, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 408 days.

(21) Appl. No.: 12/310,172

(22) PCT Filed: Apr. 14, 2008

(86) PCT No.: PCT/JP2008/057298
§ 371 (c)(1),
(2), (4) Date: Feb. 13, 2009

(87) PCT Pub. No.: WO2009/011157
PCT Pub. Date: Jan. 22, 2009

(65) Prior Publication Data
US 2009/0289218 A1    Nov. 26, 2009

(30) Foreign Application Priority Data

Jul. 19, 2007    (JP) .................................. 2007-188340

(51) Int. Cl.
*H01M 4/50* (2010.01)
*C01G 45/02* (2006.01)
(52) U.S. Cl. .................. 252/182.1; 252/518.1; 252/500; 423/599; 423/605; 429/224; 429/218.1; 429/231.1; 429/231.6; 429/231.95

(58) Field of Classification Search .................. 429/224, 429/231.1, 231.6, 231.95; 423/599, 605; 252/182.1, 518.1, 500
See application file for complete search history.

(56) References Cited

U.S. PATENT DOCUMENTS

| | | | |
|---|---|---|---|
| 6,168,888 B1 | 1/2001 | Iwata et al. | 429/231.95 |
| 6,248,477 B1 * | 6/2001 | Howard et al. | 429/224 |
| 2004/0023113 A1 * | 2/2004 | Suhara et al. | 429/231.1 |

FOREIGN PATENT DOCUMENTS

| | | |
|---|---|---|
| JP | 10-199526 | 7/1998 |
| JP | 11-71115 | 3/1999 |
| JP | 11-189419 | 7/1999 |

(Continued)

*Primary Examiner* — Stanley Silverman
*Assistant Examiner* — Kallambella Vijayakumar
(74) *Attorney, Agent, or Firm* — Drinker Biddle & Reath LLP (57) ABSTRACT

A lithium-manganese composite oxide for a lithium ion battery having a good cycle property at high-temperature and battery property of high capacity is provided. A spinel type lithium-manganese composite oxide for a lithium ion battery represented by a general formula: $Li_{1+x}Mn_{2-y}M_yO_4$ (wherein M is one or more elements selected from Al, Mg, Si, Ca, Ti, Cu, Ba, W and Pb, and, $-0.1 \leq x \leq 0.2$, and $0.06 \leq y \leq 0.3$), and when D10, D50 and D90 are defined as a particle size at which point the cumulative frequency of volume reaches 10%, 50% and 90% respectively, d10 is not less than 2 μm and not more than 5 μM, d50 is not less than 6 μm and not more than 9 μm, and d90 is not less than 12 μm and not more than 15 μM, and BET specific surface area thereof is greater than 1.0 m²/g and not more than 2.0 m²/g, and the tap density thereof is not less than 0.5 g/cm³ and less than 1.0 g/cm³.

8 Claims, 1 Drawing Sheet

FOREIGN PATENT DOCUMENTS

| | | |
|---|---|---|
| JP | 11-265717 | 9/1999 |
| JP | 2002-226214 | 8/2002 |
| JP | 2004-39539 | 2/2004 |
| JP | 2004-265749 | 9/2004 |
| JP | 3595734 | 12/2004 |
| JP | 2005-26218 | 1/2005 |
| JP | 2005-276680 | 10/2005 |
| JP | 2006-114408 | 4/2006 |
| JP | 2006-228604 | 8/2006 |
| JP | 2006-318926 | 11/2006 |
| JP | 2856015 | 12/2006 |
| WO | WO 01/92158 | 12/2001 |

* cited by examiner

LITHIUM-MANGANESE COMPOSITE OXIDES FOR LITHIUM ION BATTERY AND PROCESS FOR PREPARING SAME

TECHNICAL FIELD

The present invention relates to lithium-manganese composite oxides for a lithium ion battery and a process for preparing the same. Particularly, in the lithium-manganese composite oxides according to the present invention, a portion of manganese has been replaced with another element such as aluminum. Further, the present invention relates to a positive electrode for a lithium ion battery using the aforementioned lithium-manganese composite oxides and the lithium ion battery using the positive electrode.

BACKGROUND ART

Lithium ion battery is a secondary battery having characteristics that it has a high energy density, and enables a relatively high voltage, and thus, is widely used in small electronic equipment such as a laptop computer, a video camera, a digital camera, a mobile phone, and the like. In the future, it is also expected to be used as a power supply for large apparatuses such as an electric car, and a dispersed-type power supply for household use.

As a conventional positive electrode active material for using in a lithium ion battery, lithium composite oxides such as $LiCoO_2$, $LiNiO_2$ and $LiMn_2O_4$ are representative. Among them, $LiMn_2O_4$ having a spinel structure is noted as a positive electrode material for a lithium ion battery because it is superior in safety and advantageous in price due to the use of manganese as an abundant resource.

However, $LiMn_2O_4$ is problematic as it shows serious cycle degradation at high-temperatures and large deterioration in storage, and the capacity thereof is smaller than that of lithium cobalt oxide ($LiCoO_2$ currently predominantly used, and therefore various technical improvements have been studied for overcoming these problems.

For example, it is known that a portion of Mn in $LiMn_2O_4$ is replaced with another element in order to improve the cycle property of $LiMn_2O_4$.

Japanese Patent Application Public Disclosure No. 11-189419 (Patent literature 1) discloses that trivalent metals such as Co, Cr, Al and the like is doped to 16d site in the lithium-manganese composite oxide having a spinel structure which can be represented by a chemical composition formula $Li_{1+x}Mn_{2-y}M_yO_{4+z}$ and that the dope of trivalent metal(s) is very effective to restrict the reduction of capacity to minimum.

Further, Japanese Patent Application Public Disclosure No. 11-265717 (Patent literature 2), discloses that the capacity maintenance rate and the cycle property at high-temperature can be both increased without a large reduction of initial discharge capacity by the addition and coordination of a very small amount of element having a lattice energy (power for stabilizing the lattice) higher than Mn, namely Al or transition metals other than Mn. Concretely, a spinel type lithium-manganese oxides consisting of a general formula $LiMn_{x-y}M_yO_4$ (x: 1.8-2.1, y: 0.01-0.1, M: Al, or transition metals other than Mn). It also discloses that the added element M is substituted at the rate of 0.01-0.1 with respect to $Mn_x$ (x: 1.8-2.1) because with M less than 0.01, the capacity maintenance rate and the property at high-temperature are not improved, on the other hand, with M more than 0.1, an initial discharge capacity is largely reduced and thus it is not practical.

Patent No. 3595734 (Patent literature 3) also discloses that an electron orbital(s) in crystal is changed by replacement of a portion of Mn with other element, and the crystal structure is reinforced by increasing the bonding power between Mn—O which forms the skeleton of the crystal.

The improvement of properties has been also proposed by noticing a specific surface area.

Patent literature 1 proposes to keep the specific surface area of lithium-manganese composite oxide at or less than 1.2 $m^2/g$ in order to increase the cycle lifetime.

Japanese Patent Application Public Disclosure No. 2002-226214 (Patent literature 4) proposes to keep BET specific surface area at or less than 1.0 $m^2/g$ from the viewpoint of the stability at high-temperature and the workability for production of an electrode.

Further, Patent literature 3 proposes to keep BET specific surface area at or less than 0.9 $m^2/g$, especially at or less than 0.6 $m^2/g$ in the lithium-manganese oxide represented by $Li_{1+x}Mn_{2-x-y}Al_yO_4$ (X$\geq$0, y>0) from the viewpoint of the cycle and preservative properties at high-temperature.

The improvement of properties has been also proposed by noticing lattice constant.

For example, Patent literature 2 proposes a spinel type lithium-manganese oxide having the lattice constant at or less than 8.200-8.250 Å. It is described that when the lattice constant is set within the range, even if an element(s) other than lithium and manganese is(are) added and coordinated, the oxide may have the lattice constant very approximate to the basic lattice constant of lithium-manganese spinel structure (8.240 Å), and thus basic lattice defect may not occur.

Patent literature 3 discloses that the lattice constant should be equal to or smaller than 8.220 Å in the above-described lithium-manganese oxide from the viewpoint of the cycle and preservative at high-temperature Japanese Patent Application Public Disclosure No. 2004-265749 (Patent literature 5), it is proposed that the lattice constant of aluminum substituted lithium manganate should be equal to or less than 8.245 Å in order to prevent the reduction of the rate of maintenance of the discharge capacity and the inability to keep the charged state for a long time.

There is also a prior document in which the improvement of properties is attempted by defining the distribution of particle size.

Patent literature 4, defines the average particle size of lithium-manganese oxides within 5-20 µm, because, with the average particle size less than 5 µm, the stability at high-temperature remarkably reduces, and further the workability for production of an electrode decreases, on the other hand, with the average particle size greater than 20 µm, high-rate charge and discharge properties remarkably reduce. In working example 1, it is described that the average particle size was 15.1 µm.

Patent No. 3856015 (Patent literature 6) discloses that when D10, D50 and D90 are defined as a particle size at which point the cumulative frequency of volume reaches 10%, 50% and 90% respectively, it is desirable to satisfying all of 0.1$\leq$(D10/D50)$\leq$1, 1<(D90/D50)$\leq$3 and 5 µm$\leq$D50$\leq$40 µm. It is described that when the condition is satisfied, an electrode density may increase without imparing the improvement of the overdischarge property. In a working example 1 of Patent literature 6, it is described that D10, D50 and D90 were 10 µm, 13 µm and 18 µm, respectively, and further, in a working example 2, it is described that D10, D50 and D90 were 9 µm, 12 µm and 16 µm, respectively.

Further, there is also a prior document in which a tap density is defined. For example, Japanese Patent Application Public Disclosure No. 2006-228604 (Patent literature 7) discloses a lithium-manganese-nickel-aluminum composite oxide having a tap density of 1-1.5 g/cm$^3$. As the reason, it is described that with the tap density less than 1 g/cm$^3$, the amount which can be loaded at production of a battery decreases, and thus a definite capacity cannot be filled up, and on the other hand, with the tap density over 1.5 g/cm$^3$, the average particle diameter d50 excesses 12 μm and therefore the coating onto the surface of current collector cannot be performed evenly.

[Patent literature 1] Japanese Patent Application Public Disclosure No. 11-189419
[Patent literature 2] Japanese Patent Application Public Disclosure No. 11-265717
[Patent literature 3] Japanese Patent No. 3595734
[Patent literature 4] Japanese Patent Appln Public Disclosure No. 2002-226214
[Patent literature 5] Japanese Patent Appln Public Disclosure No. 2004-265749
[Patent literature 6] Japanese Patent No. 3856015
[Patent literature 7] Japanese Patent Appln Public Disclosure No. 2006-228604

DISCLOSURE OF THE INVENTION

Problem(s) to be Solved by the Invention

As described above, the problems such as the improvement of the cycle property at high-temperature and the capacity, which have been the weak-points of lithium ion batteries with lithium-manganese composite oxide as a positive electrode active material (or a positive electrode material) have been gradually solved, by the replacement of Mn with other element(s) and the definition of the various parameters. However, there is still room for further improvement. Namely, a certain parameter does not necessarily contribute to the improvement of properties independently of other parameters, and therefore, a certain numerical range of a parameter, which is thought to be preferable according to a document is not always be preferable, and in some cases, the range may vary when the other conditions are different. Further, when various parameters are concerned, the function between the parameters and the properties of battery becomes high dimensioned, and therefore, it will become a very difficult problem to search an optimal set of parameters which the lithium-manganese composite oxide should have when used as a positive electrode material for a lithium ion battery.

Accordingly, a problem to be solved by the present invention is to provide a lithium-manganese composite oxide for a lithium ion battery which may exert better battery properties by studying the effects of the set of parameters on the properties of the lithium ion battery, especially on the cycle property at high-temperature. Further, another problem to be solved by the present invention is to provide a preparation method of the above-described lithium-manganese composite oxide. Further, yet another problem to be solved by the present invention is to provide a positive electrode for a lithium ion battery with the above-described lithium-manganese composite oxide. Further, yet another problem to be solved by the present invention is to provide a lithium ion battery with the above-described positive electrode for a lithium ion battery.

Means for Solving the Problems

In order to solve the above-described problems, the inventors of the present invention have studied eagerly the relationship between the various parameters which define the lithium-manganese composite oxides and the properties of lithium ion battery using the oxides as a positive electrode active material, and thus, found that the lithium-manganese composite oxides which satisfy the given conditions are excellent particularly in the cycle property at high-temperature and have a high battery capacity.

Further, in general, in order to prepare a positive electrode, a binder is dissolved in an organic solvent, and then a positive electrode active material and conductive material are added to the solution so that a slurry may be prepared, and then the slurry is coated to a current collector such as an aluminum foil, and then it is dried and pressed so that a positive electrode may be obtained. Therefore, the slurry should have a good coating property for the preparation of batteries, because the material properties sometimes cannot be brought out when the coating property to the current collector is poor. The lithium-manganese composite oxides according to the present invention also have a good coating property to the current collector.

The present invention completed on the basis of the above-described findings provides, in one aspect, a spinel type lithium-manganese composite oxide for a lithium ion battery represented by a general formula: $Li_{1+x}Mn_{2-y}M_yO_4$ (wherein M is one or more elements selected from Al, Mg, Si, Ca, Ti, Cu, Ba, W and Pb, and, $-0.1 \leq x \leq 0.2$, and $0.06 \leq y \leq 0.3$), and when D10, D50 and D90 are defined as a particle size at which point the cumulative frequency of volume reaches 10%, 50% and 90% respectively, d10 is not less than 2 μm and not more than 5 μm, d50 is not less than 6 μm and not more than 9 μm, and d90 is not less than 12 μm and not more than 15 μm, and BET specific surface area thereof is greater than 1.0 m$^2$/g and not more than 2.0 m$^2$/g, and the tap density thereof is not less than 0.5 g/cm$^3$ and less than 1.0 g/cm$^3$.

In one embodiment of the lithium-manganese composite oxide according to the present invention, M is Al. In this case, it is preferable that lattice constants satisfy the following formula: A=8.343−0.250B±0.005 (wherein, A: lattice constant (Å), B: ratio of the amount of Li (molar ratio) to the amount of whole metals (indicating the sum of Mn and M, and excluding Li) calculated from the analyzed values).

In another embodiment of the lithium-manganese composite oxide according to the present invention, (1+x)/2 corresponding to a molar ratio of the amount of Li to the amount of whole metals (referred to as "Li ratio") is not less than 0.45 and not more than 0.6.

In yet another embodiment according to the present invention of the present invention, when 2 g of powder of the lithium-manganese composite oxide is introduced into a cylindrical metal mold having a diameter of 20 mm, and pressed with a pressing pressure of 0.5 ton/cm$^2$ using a uniaxial press to shape, the density of the obtained compact is not less than 1.0 g/cm$^3$ and not more than 2.0 g/cm$^3$.

In another aspect, the present invention provides a method for preparing the lithium-manganese composite oxide according to the present invention, comprising oxidizing a mixture or coprecipitate containing one or more elements selected from Al, Mg, Si, Ca, Ti, Cu, Ba, W and Pb, in addition to Li and Mn, in an atmosphere of air, using a continuous-type furnace wherein oxidation is performed at a given temperature 350-700° C. for 3-9 hours at the first step, and then, without cooling, at a given temperature 800-1000° C. for 1-5 hours at the second step. The temperature is increased to the given temperature at the first step at a rate of 350° C./hour or more and 700° C./hour or less, and then, from the given temperature at the first step to the given temperature at the second step, increased at 250° C./hour or less, and then, after the keeping the given temperature at the second step, the temperature is furnace-cooled at a rate of 300° C./hour or less.

In yet another aspect, the present invention provides a positive electrode for a lithium ion battery wherein the lithium-manganese composite oxide according to the present invention is used as a positive electrode active material.

In yet another aspect, the present invention provides a lithium ion battery wherein the above-described positive electrode is used.

The Effect of the Invention

The lithium ion battery using a lithium-manganese composite oxide according to the present invention as a positive electrode active material may have an excellent cycle property at high-temperature and a high battery capacity.

Further, in general, in order to prepare a positive electrode, a binder is dissolved in an organic solvent, and then a positive active electrode material and conductive material are added to the solution so that a slurry may be prepared, and then the slurry is coated to a current collector such as an aluminum foil, and then it is dried and pressed so that a positive electrode may be obtained. Therefore, the slurry should have a good coating property for the preparation of batteries, because the material properties sometimes cannot be brought out when the coating property to the current collector is poor. The lithium-manganese composite oxides according to the present invention also have a good coating property to the current collector.

BEST MODE FOR CARRYING OUT THE INVENTION

Composition

The spinel type lithium-manganese composite according to the invention oxides may be represented by a general formula: $Li_{1+x}Mn_{2-y}M_yO_4$ (wherein M is one or more element(s) selected from Al, Mg, Si, Ca, Ti, Cu, Ba, W and Pb, and, $-0.1 \leq x \leq 0.2$, and $0.06 \leq y \leq 0.3$). Namely, the composite oxides have a composition in which a portion of Mn has been replaced with a metal element M in lithium manganate ($LiMn_2O_4$). Al, Mg, Si, Ca, Ti, Cu, Ba, W and Pb selected as M have a large oxygen binding energy, and therefore it may be possible to prevent the deterioration of the performance of the battery due to oxygen deficiency, which has been a defect of the spinel type manganese oxides. As M, Al is particularly preferable, due to the reason on the preparation (easiness of replacement).

In the formula, y represents the degree of replacement of Mn with M. With y less than 0.06, the improvement of the properties at high-temperature is not sufficient, and with y more than 0.3, the sufficient initial capacity can not be obtained. Therefore, y is set as $0.06 \leq y \leq 0.3$, more preferably, $0.08 \leq y \leq 0.25$. Regulation of y can be performed by regulating the amount of the salts of metal for replacement upon the preparation of the mixture and/or coprecipitate.

Further, the ratio of the amount of Li to the amount of whole metals (indicating the total of Mn and M) is usually 1/2. However, the amount of lithium may be excess or deficient to the amount of whole metals. However, $(1+x)/2$ which represents the ratio of the amount of Li to the amount of whole metals is more preferably within the range $0.45 \leq (1+x)/2 \leq 0.6$, more preferably, within the range $0.51 \leq (1+x)/2 \leq 0.58$ from the aspect of the balance of the capacity and the properties (cycle property, storage property) at high-temperature.

As for the amount of oxygen (O), a partial lack and/or excess is sometimes seen practically. In this case, the amount of oxygen (O) obtained from the composition analysis is outside the theoretical chemical amount 4. However, considering the error during the composition analysis, the error within about ±5% does not greatly influence the properties, and therefore it can be considered to be substantially 4.

Form of Particle

The lithium-manganese composite oxides according to the present invention are usually provided in the form of particles. The particles may be in any forms of a primary particle, secondary particle or the mixed particles thereof. However, it is preferable that the secondary particle is formed by aggregation of the primary particles due to the reason that the coating property may be kept good during the preparation of the electrode. The good particle form is prepared by providing the energy required to grow the primary particle, and bind the primary particles with each other by the heat energy during the oxidation process.

Distribution of Particle Size

The distribution of particle size of the lithium-manganese composite oxides according to the present invention, when d10, d50 and d90 are defined as a particle size at which point the cumulative volume reaches 10%, 50% and 90% respectively, satisfies that d10 is 2 μm or more and 5 μm or less, d50 is 6 μm or more and 9 μm or less, and d90 is 12 μm or more and 15 μm or less. The reason why d10 is 2 μm or more and 5 μm or less is that with d10 less than 2 μm, poor mixing tends to occur when a slurry is prepared, and on the other hand, with d10 more than 5 μm, unevenness tends to occur on the electrode film after coating. The reason why d50, which indicates the average particle size, is 6 μm or more and 9 μm or less is that with d50 less than 6 μm, the deterioration of the properties at high-temperature (cycle property at high-temperature, storage property at high-temperature) tends to proceed, and on the other hand, with d50 more than 9 μm, when a slurry is prepared by mixing a binder, a conductive material to the composite oxide, unevenness tends to occur on the electrode film after coating of the slurry onto a current collector. The reason why d90 is 12 μm or more and 15 μm or less is, same as the reason for the range of d10, that with d90 less than 12 μm, poor mixing tends to occur when a slurry is prepared, and on the other hand, with d90 more than 15 μm, unevenness tends to occur on the electrode film after coating. When unevenness occurs on the electrode film, evenness of the electrode surface after press is lost and therefore, it is not preferable.

In the preferred embodiment of the lithium-manganese composite oxides according to the present invention, d10 is 2 μm or more and 5 μm or less, d50 is 7 μm or more and 9 μm or less, and d90 is 13 μm or more and 15 μm or less.

BET Specific Surface Area

In the lithium-manganese composite oxides according to the present invention, BET specific surface area is set so that it is more than $1.0 \, m^2/g$ and not more than $2.0 \, m^2/g$. With BET specific surface area not more than $1.0 \, m^2/g$, permeability of the electrolyte is poor, and therefore it is difficult to keep a high battery capacity. Further, with BET specific surface area more than $2.0 \, m^2/g$, a bad coating tends to occur. BET specific surface area is preferably $1.2 \, m^2/g$ or more and $1.9 \, m^2/g$ or less, more preferably, $1.3 \, m^2/g$ or more and $1.8 \, m^2/g$ or less.

Tap Density

In the lithium-manganese composite oxides according to the present invention, tap density is set so that it is 0.5 g/cm$^3$ or more and less than 1.0 g/cm$^3$. Tap density is closely correlated to a specific surface area. In general, particles having a large specific surface area have air spaces between the particles, and therefore, the tap density thereof is low. With regard to a positive electrode material for a lithium ion battery, it is necessary to consider the balance between them. It has been conventionally considered that a material having the tap density greater than 1.0 g/cm$^3$, and the specific surface area smaller than 1.0 m$^2$/g is desirable. However, it was found that, in order to achieve a high capacity, the composite oxides of the present invention having a lower tap density and a larger specific surface area are more effective and preferable from the viewpoint of permeation of electrolyte. With a tap density less than 0.5 g/cm$^3$, the film density does not increase and therefore cannot accomplish the high capacity. Further, with a specific surface area not less than 1.0 m$^2$/g, permeability of electrolyte tends to become poor. Tap density is preferably 0.7 g/cm$^3$ or more and 0.95 g/cm$^3$ or less, more preferably, 0.8 g/cm$^3$ or more and 0.9 g/cm$^3$ or less.

Lattice Constant

While the preferable range of the lattice constant of the lithium-manganese composite oxide according to the present invention is varied according to the substituent element(s) and the content of Li, it is desirable that it is approximately applied to the following empirical formula when the substitute element is aluminum.

When the lattice constant (Å) is A, and the molar ratio of the amount of Li to the amount of whole metals (Li/whole metals) calculated from the analyzed values is B $$A = 8.343 - 0.250B \pm 0.005$$

The slope and the intercept in the above-described formula was obtained by plotting 7 combinations of the lattice constant and the amount of Li with which preferable results were obtained and using the least square method so that the points may approximate to a straight line (see Example 5).

The lattice constant is one of the effective indicators which define minutely a crystalline structure. The lattice constant is varied with the position of the substituent element at Li site, and the position of the substituent element at Mn site, and influences the diffusion of Li, and therefore concerns the development of capacity.

Density of Compact

When 2 g of powder of the lithium-manganese composite oxide according to the present invention is introduced into a cylindrical metal mold having a diameter of 20 mm, and pressed with a pressing pressure of 0.5 ton/cm$^2$ using a uniaxial press to shape, the density of compact is preferably 1.0 g/cm$^3$ or more and 2.0 g/cm$^3$ or less, because with the density less than 1.0 g/cm$^3$, it is difficult to keep the high capacity, and on the other hand, with the density more than 2.0 g/cm$^3$, permeability of electrolyte is decreased and the deterioration of properties is caused. The density of compact is preferably 1.5 g/cm$^3$ or more and 2.0 g/cm$^3$ or less, more preferably, 1.7 g/cm$^3$ or more and 1.9 g/cm$^3$ or less (in this connection, the pressing pressure 0.5 ton/cm$^2$ is the pressure before the secondary particle is broken).

Preparation Process

A preparation process for preparing the lithium-manganese composite oxides according to the present invention is explained below.

In the present invention, a process for oxidizing a mixture or coprecipitate containing lithium, manganese and a substituent element having a large oxygen binding energy and replacing a portion of manganese can be used. The mixture may be ones prepared by mixing the compounds of each element using an ordinary process, and the coprecipitate also may be ones which can be prepared by an ordinary process (coprecipitation as hydroxide or carbonate).

Concretely, the raw material mixture is prepared by mixing various raw materials so that the metal elements which constitute the crystal of lithium-manganese composite oxide may be present in the crystalline structure in the desired composition rate. As the raw materials, lithium compounds, manganese compounds and the compound of a different element M are included.

As the lithium compounds, without limitation, lithium carbonate, lithium hydroxide, lithium oxide, lithium chloride, lithium nitrate, lithium sulfate, lithium hydrogencarbonate, lithium acetate, lithium fluoride, lithium bromide, lithium iodide, lithium peroxide are mentioned. Among them, lithium carbonate is preferable because it may be easily handled and inexpensive.

As the manganese compounds, without limitation, a metal manganese, manganese oxide, manganese hydroxide, manganese nitrate, manganese carbonate, manganese chloride, manganese iodide, manganese sulfate are mentioned. Among them, manganese carbonate, a metal manganese, manganese chloride and manganese sulfate are preferable, because they are easily mixed, and easily coprecipitated (the solubility in the solution is high).

When aluminum is employed as the different element M, as the aluminum compounds, without limitation, aluminum oxide, aluminum nitrate, aluminum carbonate, aluminum hydroxide and aluminum chloride are mentioned. Among them, aluminum oxide and aluminum chloride are preferable, because they are easily mixed, and easily coprecipitated (the solubility in the solution is high).

When Mg, Si, Ca, Ti, Cu, Ba, W or Pb is employed as the different element M, the carbonates, nitrates, hydroxides, chlorides, oxides and the like may be used in the same way as described above.

The mixing process is explained. As the mixing process, without limitation, a process wherein the raw powders are mixed as they are, and a process wherein the raw materials are dissolved or suspended in water and/or organic solvent and then they are mixed are mentioned. The latter is preferable, because the raw materials may be more evenly mixed.

A preferred embodiment of the latter is exemplified. First, a suspension of lithium carbonate is prepared with a pure water. The concentration of lithium carbonate in the suspension is preferably from about 20 g/L to 600 g/L in accordance with the amount to be mixed. Subsequently, into the suspension of lithium carbonate, a desired amount of an aqueous solution of chloride of Mn and the different element(s) such as Al and the like are introduced or dropped. The rate of introduction of the aqueous solution of the chloride is preferably regulated so that the total amount thereof may be added for a period of time from 10 minutes to 20 hours in order to control the particle diameter and the form of the particle prepared. While the temperature of the each fluid may be at room temperature, it is also possible to heat them. Further, upon the introduction of the aqueous solution of chloride, it is desirable to stir the suspension of lithium carbonate at the rate of stirring 50-400 rpm for the purpose of controlling the binding state of the particles. The rate of stirring is determined in accordance with the bath. The rates of introduction and stirring are regulated so that carbonate with the desired particle size is precipitated. The precipitate is taken with filtration and washed with water, and a raw material mixture is thus obtained.

By oxidizing process (calcinations in oxidizing atmosphere and the like) of the raw material mixture under a proper condition, the lithium-manganese composite oxide according to the present invention is obtained. This is used as a positive electrode active material of the secondary lithium battery.

It is important for the oxidizing process that a continuous-type furnace is used and two step temperature regulation is performed, because with a stationary type furnace, the variability of the products is large which is industrially disadvantageous. As the two step temperature regulation, it is desirable that an oxidizing process is performed as the first step at the given temperature 350-700° C. for 3-9 hours, and performed as the second step at given temperature 800-1000° C. for 1-5 hours. It is more desirable that the oxidizing process is performed as the first step at the given temperature 400-600° C. for 4-8 hours, and performed as the second step at given temperature 850-950° C. for 2-4 hours. It is not required that "the given temperature" at each step is strictly kept at a constant temperature, and the temperature may be deemed to be the given temperature when there is not any substantial variation. For example, it is allowed that there is a variation of ±5° C. which is within the degree of dispersion of distribution in the furnace. From the viewpoint of ensuring the mass productivity, after completion of the fist step at the given temperature, without cooling, the temperature is increased to the given oxidizing temperature at the second step. The treatment of the first step is performed for the purpose of oxidizing the carbonate which is the raw material mixture to the oxide. The treatment of the second step is oxidization of the oxide obtained in the first step to the lithium-manganese oxide substituted with the desired different element(s). It is important that no unreacted material remains at each treatment temperature, and any other byproduct is not produced for developing the properties. Therefore, it is not preferable that the temperature of the first step is less than 350° C., because the oxidation of carbonate, which is the raw material mixture becomes not sufficient. On the other hand, it is not preferable that the temperature at the first step is more than 700° C., because a portion is changed into a spinel oxide and becomes the byproduct. Further, it is not preferable that the temperature of the second step is less than 800° C., because conversion into the lithium-manganese oxide is not sufficient. On the other hand, it is not preferable that the temperature is more than 1000° C., because the oxygen deficiency tends to occur.

Further, to the given temperature at the first step, the temperature is increased at the rate of 350° C./hour or more and 700° C./hour or less. From the given temperature at the first step to the given temperature at the second step, the temperature is increased at the rate of 250° C./hour or less. After keeping the given temperature at the second step, the temperature is decreased at the rate of 300° C./hour or less in the furnace. To the given temperature at the first step, it is not preferable that the rate is less than 350° C./hour, from the viewpoint of the aspect of the mass productivity. On the other hand, it is not preferable that the rate is more than 700° C./hour, because the crucible is sometimes broken by heat-shock. From the given temperature at the first step to the given temperature at the second step, the follow-up property of the temperature of the material is most important. It is not preferable that the rate is more than 250° C./hour, because the difference between the temperature of the material and the temperature set (the temperature in the furnace) sometimes occurs and the reaction for producing the spinel one cannot be proceeded sufficiently. While the temperature is reduced in the furnace after keeping the second step, it is not preferable that the rate of cooling is more than 300° C./hour, because the crucible is sometimes broken by a heat-shock.

The rate of increasing the temperature to the given temperature at the first step is obtained by dividing the temperature difference from the temperature at start of heating (room temperature) to the given temperature at the first step by the time taken from the start of heating to reach the given temperature at the first step.

The rate of increasing the temperature from the given temperature at the first step to that of second step is obtained by dividing the temperature difference from the given temperature at the first step to that at second step by the time taken from the given temperature at the first step to that at the second step.

The rate of cooling after keeping at the given temperature at the second step is obtained by dividing the temperature difference from the given temperature at the second step to 300° C. by the time taken from the given temperature at the second step to 300° C.

In addition to the above-described conditions, the total time taken from entering the raw material mixture into the continuous-type furnace to leaving from it is preferably 12-24 hours, because each reaction at the first and second steps should be sufficiently performed.

Figure 1:
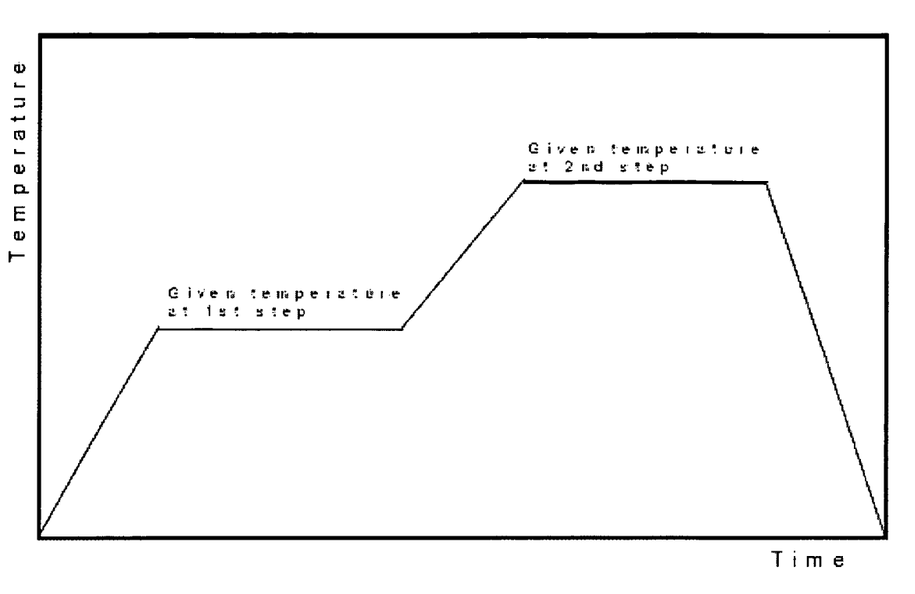
FIG. 1 shows a representative example of the temperature profile during the oxidation process.

The representative temperature profile is shown in FIG. 1.

It is desirable that the oxidizing process is performed in an atmosphere of air from the viewpoint of the mass productivity. However, the atmosphere containing oxygen having the concentration which allows the oxidation of the raw material mixture to proceed at the proper rate (ex.: the concentration of oxygen is 5 vol % or more) and inert gases such as nitrogen and argon may be employed. Such atmosphere is also referred to as the atmosphere of air in the present invention.

The relation between the above-described process for preparation and the various parameters defined in the present invention is summarized while it also includes the contents, which have been already explained.

The composition of the lithium-manganese composite oxide may be regulated by the charge of each compound (mixing ratio) at mixing. Further, particle size distribution, BET specific surface area, tap density and compact density, which are powder properties, can be regulated by a mixing process and oxidizing process. The degree of uniformity at mixing affects, at the oxidizing process, the formation of the primary particle and aggregation of the secondary particle, and therefore, the particle size distribution, BET specific surface area, tap density and compact density can be regulated. There is a tendency that when the degree of uniformity is high, the particle size becomes fine, BET specific surface area becomes large, and the density becomes low. Further, the lattice constant may be primarily regulated by the composition of the materials.

The lithium-manganese composite oxide thus obtained may be used as a positive electrode active material, and a positive electrode and further a lithium ion battery may be prepared according to the known means.

For example, a positive mixture is prepared by mixing a binder such as polyvinylidene fluoride, polytetrafluoroethylene or polyamide acryl resin and the like, and conductive material such as acetylene black, graphite and the like into the powder of the lithium-manganese composite oxide. Subsequently, the positive mixture is coated as a slurry onto a current collector such as aluminum foil and then it may be pressed for preparing a positive electrode.

In the present invention, the evaluation of the properties of material is performed as follows.

(Composition)

As for the composition, each element (Li, Mn, Al, etc.) in the materials is calculated from the results of the quantitative analysis by ICP-MS (ICP mass spectrometer). In the working examples, SPQ-9100 type (SII Nanotechnologies) was used.
(Form of Particles)

Observation of the form of particles is performed with FE-SEM (field-effect type scanning electron microscope). In the working examples, JSM-6700 type (JEOL) was used.
(Particle Size Distribution)

The particle size distribution of the materials is determined using a laser diffraction particle size analyzer (see JIS-K-5600-9-3). From the cumulative particle size distribution, the particle sizes at which point the cumulative volume reaches 10%, 50% and 90% respectively are ascertained and they are defined as d10, d50 (average particle size) and d90, respectively. In the working examples, a laser diffraction particle size analyzer SALD-3000 (Shimazu Corporation) was used.
(Bet Specific Surface Area)

The results from the measurement of the specific surface area by BET method performed with the single-point method are used (see JIS-Z-8830). In the working examples, a surface area analyzer MONOSORB (Yuasa-Ionics), which uses a flow method for determination of single-point BET specific surface area, was used.
(Tap Density)

50 g of material is introduced into the cylinder of the measuring device for tap density and the volume is measured after 200 taps and tap density is calculated (see JIS-Z-2512). In the working examples, a measuring device for bulk density TPM-1.P (Tsutsui Scientific Instruments) was used.
(Lattice Constant)

Using a X-ray diffractometer with Cu target, the measurement for 10°-80° is performed, and then the lattice constant is calculated by the least square method from the results of the diffraction peak position, and d value. In the working examples, RINT-1100 type X-ray diffractometer (Rigaku) was used.

The crystalline structure of material is determined by comparison to JCPDS card using the X-ray diffractometer.
(Compact Density)

2 g of powder of material is introduced into a cylindrical metal mold having a diameter of 20 mm, and pressed for 30 seconds with a given pressure of 0.5 ton/cm$^2$ using a uniaxial press, and then the compact density is obtained from the pressed volume. The given pressure of 0.5 ton/cm$^2$ is the pressing pressure before the secondary particle is broken.
(Coating Property)

The material, conductive material (Denka Black HS-100, DENKI KAGAKU KOGYO KABUSHIKI KAISHA) and binder (PVDF resin: KF-1100 produced by Kureha Corporation) are weighed in the weight ratio 85:8:7, and then the material and the conductive material are mixed into the organic solvent (N-methylpyrrolidone), into which the binder has been dissolved, so that a slurry may be formed. The slurry is coated onto the Al foil. The coating property is estimated by the degree of appearance of "line" on the coating film. The case where "line" does not appear is deemed to be ○, and the case where "line" appears is deemed to be ×.
(Evaluation of Batteries)

The material, conductive material (Denka Black HS-100, DENKI KAGAKU KOGYO KABUSHIKI KAISHA) and binder (PVDF resin: KF-1100 produced by Kureha Corporation) are weighed in the weight ratio 85:8:7, and then the material and the conductive material are mixed into the organic solvent (N-methylpyrrolidone), into which the binder has been dissolved, so that a slurry may be formed. The slurry is coated onto the Al foil and dried, and then it is pressed to produce a positive electrode. 2032 type coin cell for evaluation wherein the opposite electrode is Li is prepared, and charge and discharge are performed using, as the electrolyte, the solution of 1M-LiPF$_6$ in EC-DMC (volume ratio: 1:1) wherein the charging condition is 4.3 V and discharging condition is 3.0 V Confirmation of the initial capacity is performed with the charge and discharge at 0.2 C. Cycle property at high-temperature (55° C.) is confirmed by performing 0.5 C charge and 1 C discharge, and checking the capacity maintenance rate (%) after 50 cycles. The capacity maintenance rate (%) after the storage at high-temperature (55° C.) for one week compared to the initial capacity is defined as a high-temperature storage property.

EXAMPLE

As described below, several working examples are presented so that the present invention and its advantage may be well understood. However, the present invention is not limited to these working examples.

Example 1

Influence of Particle Size Distribution

A suspension of 135 g of lithium carbonate in 320 mL pure water was prepared, and pH thereof was adjusted to 7.5 by blowing carbon dioxide gas into it. Separately, a solution of 266 g manganese chloride and 17 g aluminum chloride in 300 mL pure water was prepared. The solution was dropped into the above-mentioned suspension in 200 minutes, to prepare a carbonate containing lithium, manganese and aluminum (mixture of lithium carbonate, manganese carbonate and aluminum carbonate).

The carbonate was washed and filtrated with a saturated lithium carbonate solution to prevent lithium carbonate elution, and dried by hot-air at 110° C.

The materials having different particle size shown in Table 1 were prepared by oxidizing the carbonate raw material in various oxidizing conditions, and then the coating property of them was studied. When the content of each element was measured by ICP-MS to determine the composition, it was confirmed that Al substitution rate was 5% (y=0.1 in $Li_{1+x}Mn_{2-y}M_yO_4$). Further, it was confirmed, by X-ray diffraction (RINT-1100 type X-ray diffractometer available from Rigaku), that all of the oxidized materials were spinel type lithium-manganese oxide. Further, it was confirmed, by FE-SEM (JSM-6700 type available from JEOL), that the materials formed the secondary particles.

Example 2

Influence of Specific Surface Area and Tap Density

The carbonate containing lithium, manganese and aluminum was prepared in the same way as Example 1 with the exception that the amount of lithium carbonate was 125 g.

The materials having different specific surface areas and tap densities shown in Table 2 were prepared by oxidizing the carbonate raw material in various oxidizing conditions. When the content of each element was measured by ICP-MS to determine the composition, it was confirmed that Al substitution rate was 5% (y=0.1 in $Li_{1+x}Mn_{2-y}M_yO_4$). Further, it was confirmed, by X-ray diffraction, that all of the oxidized materials were spinel type lithium-manganese oxide. Further, it was confirmed, by observation with SEM, that the materials formed the secondary particles.

Example 3

Influence of Lithium Ratio and Lattice Constant

An aqueous solution containing chloride of manganese and aluminum was prepared in the same way as described in Example 1. Fluids were prepared by suspending 95 g (3-1~3-

3), 115 g (3-4~3-6), 125 g (3-7~3-9), 135 g (3-10~3-12) and 155 g (3-13~3-15) of lithium carbonate into 320 mL of pure water, and pH of the fluids were adjusted to 7.5 by blowing carbon dioxide gas into them. To these fluids, the solution of chloride was dropped in 200 minutes, and thus, the carbonates containing lithium, manganese and aluminum (mixture of lithium carbonate, manganese carbonate and aluminum carbonate) were prepared.

The materials having different lithium ratio and lattice constant shown in Table 3 were prepared by oxidizing the carbonate raw materials in various oxidizing conditions. When the content of each element was measured by ICP-MS to determine the composition, it was confirmed that Al substitution rate was 5% (y=0.1 in $Li_{1+x}Mn_{2-y}M_yO_4$). Further, it was confirmed, by X-ray diffraction, that all of the oxidized materials were spinel type lithium-manganese oxide. Further, it was confirmed, by observation with SEM, that the materials formed the secondary particles.

Example 4

Influence of Oxidizing Condition

The carbonate containing lithium, manganese and aluminum was prepared in the same way as Example 1 with the exception that the amount of lithium carbonate was 115 g.

The materials shown in Table 4 were prepared by oxidizing the carbonate raw material in various oxidizing conditions. When the content of each element was measured by ICP-MS to determine the composition, it was confirmed that Al substitution rate was 5% (y=0.1 in $Li_{1+x}Mn_{2-y}M_yO_4$). Further, it was confirmed, by X-ray diffraction, that all of the oxidized materials were spinel type lithium-manganese oxide. Further, it was confirmed, by observation with SEM, that the materials formed the secondary particles.

Example 5

Lattice Constant

The carbonates containing lithium, manganese and aluminum were prepared in the same way as Example 1 with the exception that the amount of lithium carbonate was varied respectively.

The materials shown in Table 5 were prepared by oxidizing the carbonate raw material. When the content of each element was measured by ICP-MS to determine the composition, it was confirmed that Al substitution rate was 5% (y–0.1 in $Li_{1+x}Mn_{2-y}M_yO_4$). Further, it was confirmed, by X-ray diffraction, that all of the oxidized materials were spinel type lithium-manganese oxide. Further, it was confirmed, by observation with SEM, that the materials formed the secondary particles.

TABLE 1

| | | Oxidizing condition | | | | | | | |
|---|---|---|---|---|---|---|---|---|---|
| No. | Li ratio (Molar ratio) | Rate of increase of temp. to the 1st step °C./h | Rate of increase of temp. from the 1st step to the 2nd step °C./h | Rate of cooling after the end of 2nd step °C./h | 1st step Temp. (°C.)/Time (h) | 2nd step Temp. (°C.)/Time (h) | Particle size distribution (μm) | | |
| | | | | | | | d10 | d50 | d90 |
| 1-1 | 0.56 | 400 | 200 | 150 | 400/4 | 850/2 | 3.2 | 7.2 | 13.5 |
| 1-2 | 0.56 | 350 | 250 | 150 | 350/4 | 850/2 | 1.7 | 6.5 | 12.5 |
| 1-3 | 0.56 | 400 | 250 | 200 | 400/4 | 900/2 | 5.5 | 8.9 | 14.6 |
| 1-4 | 0.56 | 350 | 200 | 150 | 350/3 | 800/2 | 2.5 | 5.5 | 12.3 |
| 1-5 | 0.56 | 450 | 200 | 200 | 450/4 | 900/2 | 4.8 | 9.2 | 13.8 |
| 1-6 | 0.56 | 450 | 200 | 150 | 450/3 | 850/2 | 2.2 | 6.8 | 11.8 |
| 1-7 | 0.56 | 450 | 250 | 250 | 450/4 | 1000/2 | 4.3 | 8.8 | 15.3 |

| No. | BET specific surface area (m²/g) | Tap density (g/cm³) | Lattice const. (Å) | Compact density (g/cm³) | Coating property | Initial capacity (mAh/g) | Cycle property (%) | High-temperature storage property (%) |
|---|---|---|---|---|---|---|---|---|
| 1-1 | 1.3 | 0.8 | 8.203 | 1.8 | ○ | 106 | 99 | 99 |
| 1-2 | 1.8 | 0.6 | 8.199 | 1.6 | X | 100 | 96 | 96 |
| 1-3 | 1.2 | 0.8 | 8.203 | 1.8 | X | 102 | 98 | 97 |
| 1-4 | 1.9 | 0.6 | 8.200 | 1.6 | X | 100 | 96 | 96 |
| 1-5 | 1.1 | 0.9 | 8.203 | 1.8 | X | 103 | 96 | 97 |
| 1-6 | 1.9 | 0.7 | 8.205 | 1.5 | X | 104 | 97 | 97 |
| 1-7 | 0.9 | 0.9 | 8.199 | 1.9 | X | 101 | 95 | 95 |

TABLE 2

| | | Oxidizing condition | | | | | | | |
|---|---|---|---|---|---|---|---|---|---|
| No. | Li ratio (Molar ratio) | Rate of increase of temp. to the 1st step °C./h | Rate of increase of temp. from the 1st step to the 2nd step °C./h | Rate of cooling after the end of 2nd step °C./h | 1st step Temp. (°C.)/Time (h) | 2nd step Temp. (°C.)/Time (h) | Particle size distribution (μm) | | |
| | | | | | | | d10 | d50 | d90 |
| 2-1 | 0.52 | 400 | 200 | 150 | 400/4 | 850/2 | 3.5 | 7.8 | 13.8 |
| 2-2 | 0.52 | 400 | 250 | 200 | 400/4 | 950/2 | 4.5 | 8.8 | 15.5 |
| 2-3 | 0.52 | 400 | 200 | 150 | 400/2 | 800/2 | 1.8 | 5.5 | 11.9 |
| 2-4 | 0.52 | 400 | 100 | 150 | 700/4 | 800/2 | 2.1 | 5.8 | 12.2 |
| 2-5 | 0.52 | 400 | 100 | 250 | 800/4 | 1000/2 | 5.5 | 8.8 | 15.8 |

TABLE 2-continued

| No. | BET specific surface area (m²/g) | Tap density (g/cm³) | Lattice const. (Å) | Compact density (g/cm³) | Coating property | Initial capacity (mAh/g) | Cycle property (%) | High-temperature storage property (%) |
| --- | --- | --- | --- | --- | --- | --- | --- | --- |
| 2-1 | 1.3 | 0.8 | 8.215 | 1.8 | ○ | 110 | 98 | 98 |
| 2-2 | 0.6 | 0.9 | 8.211 | 1.9 | ○ | 108 | 95 | 95 |
| 2-3 | 2.1 | 0.6 | 8.208 | 1.4 | X | 107 | 92 | 93 |
| 2-4 | 1.1 | 0.4 | 8.206 | 1.2 | X | 105 | 93 | 93 |
| 2-5 | 0.4 | 1.2 | 8.200 | 2.1 | ○ | 100 | 92 | 92 |

TABLE 3

| No. | Li ratio (Molar ratio) | Oxidizing condition | | | 1st step Temp. (° C.)/Time (h) | 2nd step Temp. (° C.)/Time (h) | Particle size distribution (μm) | | |
| --- | --- | --- | --- | --- | --- | --- | --- | --- | --- |
| | | Rate of increase of temp. to the 1st step ° C./h | Rate of increase of temp. from the 1st step to the 2nd step ° C./h | Rate of cooling after the end of 2nd step ° C./h | | | d10 | d50 | d90 |
| 3-1 | 0.43 | 400 | 200 | 200 | 400/4 | 900/2 | 2.5 | 6.5 | 12.8 |
| 3-2 | 0.43 | 500 | 200 | 250 | 500/4 | 1000/2 | 3.0 | 8.3 | 15.5 |
| 3-3 | 0.43 | 400 | 150 | 150 | 400/4 | 800/2 | 1.5 | 5.8 | 12.6 |
| 3-4 | 0.49 | 400 | 200 | 200 | 400/4 | 900/2 | 2.8 | 7.5 | 13.2 |
| 3-5 | 0.49 | 500 | 200 | 250 | 500/4 | 1000/2 | 3.2 | 8.5 | 15.8 |
| 3-6 | 0.49 | 400 | 150 | 150 | 400/4 | 800/2 | 1.8 | 6.9 | 12.9 |
| 3-7 | 0.52 | 400 | 200 | 200 | 400/4 | 900/2 | 3.4 | 8.2 | 14.2 |
| 3-8 | 0.52 | 500 | 200 | 250 | 500/4 | 1000/2 | 4.2 | 9.3 | 14.8 |
| 3-9 | 0.52 | 400 | 150 | 150 | 400/4 | 800/2 | 2.8 | 7.8 | 13.8 |
| 3-10 | 0.56 | 400 | 200 | 200 | 400/4 | 900/2 | 4.2 | 8.6 | 14.7 |
| 3-11 | 0.56 | 500 | 200 | 250 | 500/4 | 1000/2 | 4.8 | 9.2 | 15.5 |
| 3-12 | 0.56 | 400 | 150 | 150 | 400/4 | 800/2 | 3.2 | 7.6 | 13.9 |
| 3-13 | 0.62 | 400 | 200 | 200 | 400/4 | 900/2 | 4.6 | 9.2 | 15.2 |
| 3-14 | 0.62 | 500 | 200 | 250 | 500/4 | 1000/2 | 5.1 | 9.6 | 15.6 |
| 3-15 | 0.62 | 400 | 150 | 150 | 400/4 | 800/2 | 3.5 | 8.2 | 14.2 |

| No. | BET specific surface area (m²/g) | Tap density (g/cm³) | Lattice const. (Å) | Compact density (g/cm³) | Coating property | Initial capacity (mAh/g) | Cycle property (%) | High-temperature storage property (%) |
| --- | --- | --- | --- | --- | --- | --- | --- | --- |
| 3-1 | 1.8 | 0.7 | 8.236 | 1.9 | ○ | 125 | 88 | 86 |
| 3-2 | 1.3 | 0.8 | 8.242 | 1.8 | X | 126 | 85 | 86 |
| 3-3 | 2.1 | 0.5 | 8.230 | 1.4 | X | 115 | 84 | 85 |
| 3-4 | 1.6 | 0.9 | 8.221 | 1.9 | ○ | 120 | 98 | 98 |
| 3-5 | 1.2 | 0.8 | 8.230 | 1.9 | X | 118 | 95 | 94 |
| 3-6 | 1.9 | 0.6 | 8.215 | 1.4 | X | 116 | 95 | 96 |
| 3-7 | 1.5 | 0.8 | 8.214 | 1.8 | ○ | 110 | 99 | 99 |
| 3-8 | 1.3 | 0.8 | 8.220 | 1.8 | X | 109 | 96 | 94 |
| 3-9 | 1.8 | 0.5 | 8.205 | 1.6 | ○ | 108 | 96 | 93 |
| 3-10 | 1.3 | 0.8 | 8.203 | 1.8 | ○ | 106 | 99 | 99 |
| 3-11 | 1.2 | 0.9 | 8.210 | 1.8 | X | 104 | 96 | 93 |
| 3-12 | 1.8 | 0.6 | 8.196 | 1.6 | ○ | 100 | 97 | 94 |
| 3-13 | 1.2 | 0.9 | 8.190 | 1.8 | X | 98 | 86 | 86 |
| 3-14 | 1.1 | 0.9 | 8.195 | 1.9 | X | 100 | 85 | 84 |
| 3-15 | 1.5 | 0.8 | 8.183 | 1.8 | ○ | 95 | 86 | 85 |

TABLE 4

| No. | Li ratio (Molar ratio) | Oxidizing condition | | | 1st step Temp. (° C.)/Time (h) | 2nd step Temp. (° C.)/Time (h) | Particle size distribution (μm) | | |
| --- | --- | --- | --- | --- | --- | --- | --- | --- | --- |
| | | Rate of increase of temp. to the 1st step ° C./h | Rate of increase of temp. from the 1st step to the 2nd step ° C./h | Rate of cooling after the end of 2nd step ° C./h | | | d10 | d50 | d90 |
| 4-1 | 0.49 | 400 | 100 | 150 | 400/4 | 750/2 | 1.9 | 7.2 | 12.8 |
| 4-2 | 0.49 | 400 | 150 | 200 | 400/4 | 850/2 | 2.5 | 7.6 | 13.2 |
| 4-3 | 0.49 | 400 | 200 | 200 | 400/4 | 950/2 | 3.8 | 8.5 | 14.6 |
| 4-4 | 0.49 | 400 | 250 | 250 | 400/4 | 1050/2 | 5.2 | 9.2 | 15.1 |
| 4-5 | 0.49 | 400 | 200 | 200 | 300/4 | 900/2 | 1.9 | 6.8 | 13.0 |
| 4-6 | 0.49 | 400 | 150 | 200 | 400/4 | 900/2 | 2.6 | 7.3 | 13.2 |
| 4-7 | 0.49 | 500 | 100 | 200 | 500/4 | 900/2 | 3.2 | 7.5 | 13.5 |

TABLE 4-continued

| No. | Li ratio (Molar ratio) | Rate of increase of temp. to the 1st step °C./h | Rate of increase of temp. from the 1st step to the 2nd step °C./h | Rate of cooling after the end of 2nd step °C./h | 1st step Temp. (°C.)/Time (h) | 2nd step Temp. (°C.)/Time (h) | d10 | d50 | d90 |
|---|---|---|---|---|---|---|---|---|---|
| 4-8 | 0.49 | 600 | 100 | 200 | 600/4 | 900/2 | 3.6 | 8.0 | 13.8 |
| 4-9 | 0.49 | 700 | 100 | 200 | 700/4 | 900/2 | 4.2 | 8.6 | 14.6 |
| 4-10 | 0.49 | 400 | 100 | 200 | 800/4 | 900/2 | 5.2 | 9.2 | 15.0 |

| No. | BET specific surface area ($m^2/g$) | Tap density ($g/cm^3$) | Lattice const. (Å) | Compact density ($g/cm^3$) | Coating property | Initial capacity (mAh/g) | Cycle property (%) | High-temperature storage property (%) |
|---|---|---|---|---|---|---|---|---|
| 4-1 | 2.1 | 0.5 | 8.205 | 1.3 | X | 110 | 93 | 93 |
| 4-2 | 1.8 | 0.8 | 8.221 | 1.7 | ○ | 124 | 98 | 98 |
| 4-3 | 1.6 | 0.7 | 8.225 | 1.7 | ○ | 125 | 96 | 96 |
| 4-4 | 1.0 | 0.9 | 8.230 | 1.8 | X | 110 | 93 | 93 |
| 4-5 | 2.0 | 0.6 | 8.207 | 1.4 | X | 118 | 93 | 93 |
| 4-6 | 1.8 | 0.8 | 8.218 | 1.6 | ○ | 125 | 98 | 98 |
| 4-7 | 1.6 | 0.8 | 8.220 | 1.6 | ○ | 120 | 98 | 98 |
| 4-8 | 1.6 | 0.7 | 8.219 | 1.7 | ○ | 120 | 97 | 97 |
| 4-9 | 1.5 | 0.8 | 8.220 | 1.7 | ○ | 120 | 96 | 96 |
| 4-10 | 1.3 | 0.9 | 8.230 | 1.8 | X | 108 | 92 | 92 |

TABLE 5

| | | Oxidizing condition | | | | | | | |
|---|---|---|---|---|---|---|---|---|---|
| No. | Li ratio (Molar ratio) | Rate of increase of temp. to the 1st step °C./h | Rate of increase of temp. from the 1st step to the 2nd step °C./h | Rate of cooling after the end of 2nd step °C./h | 1st step Temp. (°C.)/Time (h) | 2nd step Temp. (°C.)/Time (h) | Particle size distribution (μm) | | |
| | | | | | | | d10 | d50 | d90 |
| 5-1 | 0.46 | 400 | 200 | 200 | 400/4 | 900/2 | 3.5 | 8.5 | 14.8 |
| 5-2 | 0.49 | 400 | 200 | 200 | 400/4 | 900/2 | 3.1 | 7.1 | 13.6 |
| 5-3 | 0.54 | 400 | 200 | 200 | 400/4 | 900/2 | 3.3 | 7.6 | 14.0 |
| 5-4 | 0.55 | 400 | 200 | 200 | 400/4 | 900/2 | 3.4 | 8.0 | 14.4 |
| 5-5 | 0.56 | 400 | 200 | 200 | 400/4 | 900/2 | 3.2 | 7.0 | 13.8 |
| 5-6 | 0.57 | 400 | 200 | 200 | 400/4 | 900/2 | 2.9 | 6.9 | 13.4 |
| 5-7 | 0.57 | 400 | 200 | 200 | 400/4 | 900/2 | 3.0 | 7.1 | 13.8 |

| No. | BET specific surface area ($m^2/g$) | Tap density ($g/cm^3$) | Lattice const. (Å) | Compact density ($g/cm^3$) | Coating property | Initial capacity (mAh/g) | Cycle property (%) | High-temperature storage property (%) |
|---|---|---|---|---|---|---|---|---|
| 5-1 | 1.3 | 0.8 | 8.225 | 1.9 | ○ | 123 | 95 | 93 |
| 5-2 | 1.8 | 0.8 | 8.224 | 1.9 | ○ | 120 | 95 | 94 |
| 5-3 | 1.5 | 0.9 | 8.209 | 1.8 | ○ | 110 | 96 | 96 |
| 5-4 | 1.3 | 0.9 | 8.205 | 1.8 | ○ | 108 | 97 | 98 |
| 5-5 | 1.2 | 0.9 | 8.203 | 1.8 | ○ | 106 | 98 | 99 |
| 5-6 | 1.1 | 0.9 | 8.202 | 1.9 | ○ | 106 | 99 | 99 |
| 5-7 | 1.1 | 0.9 | 8.200 | 1.8 | ○ | 105 | 99 | 99 |

The invention claimed is:

1. A spine type lithium-manganese composite oxide for a lithium ion battery represented by a general formula $Li_{1+x}Mn_{2-y}M_yO_4$, wherein M is one or more elements selected from Al, Mg, Si, Ca, Ti, Cu, Ba, W and Pb, and, $-0.1 \leq x \leq 0.2$, and $0.06 \leq y \leq 0.3$, and when d10, d50 and d90 are defined as a particle size at which point the cumulative frequency of volume reaches 10%, 50% and 90% respectively, d10 is not less than 2 μm and not more than 5 μm, d50 is not less than 6 and not more than 9 μm, and d90 is not less than 12 μm and not more than 15 μm, the BET specific surface area is greater than 1.0 $m^2/g$ and not more than 2.0 $m^2/g$, and the tap density is not less than 0.5 $g/cm^3$ and less than 0.9 $g/cm^3$.

2. The lithium-manganese composite oxide according to claim 1, wherein M is Al.

3. The lithium-manganese composite oxide according to claim 2, wherein the lattice constants satisfy the following empirical formula: $A = 8.343 - 0.250B \pm 0.005$ wherein, A is the lattice constant (Å), B is the molar ratio of the amount of Li to the total amount of Mn and M calculated from the analyzed values.

4. The lithium-manganese composite oxide according to claim 1, wherein $(1+x)/2$ corresponding to the molar ratio of Li to the total amount of Mn and M is not less than 0.51 and not more than 0.58.

5. The lithium-manganese composite oxide according to claim wherein when 2 g of powder of the lithium-manganese composite oxide is introduced into a cylindrical metal mold having a diameter of 20 mm, and pressed with a pressing pressure of 0.5 ton/$cm^2$ using a uniaxial press to shape, the density of the obtained compact is 1.0 $g/cm^3$ or more and 2.0 $g/cm^3$ or less.

6. A method for preparing the lithium-manganese composite oxide according to claim 1, comprising:

providing a mixture or coprecipitate containing one or more elements selected from Al, Mg, Si, Ca, Ti, Cu, Ba, W and Pb, in addition to Li and Mn;

oxidizing the mixture or coprecipitate in an atmosphere of air, using a continuous-type furnace wherein the oxidation is performed by the following successive steps:

1) heating the mixture or coprecipitate at a rate of 350° C./hour or more and 700° C./hour or less to a first given temperature of 350-700° C.;
2) oxidizing the mixture or coprecipitate at the first given temperature for 3-9 hours;
3) without cooling, further heating the mixture or coprecipitate at a rate of 250° C./hour or less to a second given temperature of 800-1000° C.;
4) oxidizing the mixture or coprecipitate at the second given temperature for 1-5 hours; and then 5) furnace-cooling the mixture or coprecipitate at a rate of 300° C./hour or less.

7. A positive electrode for a lithium ion battery, wherein the lithium-manganese composite oxide according to any one of claims 1-5 comprises a positive electrode active material.

8. A lithium ion battery comprising the positive electrode according to claim 7.

* * * * *

UNITED STATES PATENT AND TRADEMARK OFFICE
CERTIFICATE OF CORRECTION

PATENT NO. : 8,114,309 B2
APPLICATION NO. : 12/310172
DATED : February 14, 2012
INVENTOR(S) : Kajiya et al.

It is certified that error appears in the above-identified patent and that said Letters Patent is hereby corrected as shown below:

Column 17, line 48, claim 1, change "spine" to --spinel--.

Column 17, line 57, claim 1, after "6" insert --μm--.

Column 18, line 56, claim 5, after "claim" insert --1--.

Signed and Sealed this
Seventeenth Day of April, 2012

David J. Kappos
*Director of the United States Patent and Trademark Office*